United States Patent [19]
Kanai

[11] Patent Number: 4,578,703
[45] Date of Patent: Mar. 25, 1986

[54] SUBSCRIPTION TELEVISION SYSTEM

[75] Inventor: Tsutomu Kanai, Saitama, Japan

[73] Assignee: Clarion Co., Ltd., Tokyo, Japan

[21] Appl. No.: 560,908

[22] Filed: Dec. 12, 1983

Related U.S. Application Data

[63] Continuation-in-part of Ser. No. 290,384, Aug. 5, 1981.

[51] Int. Cl.[4] .............................................. H04N 7/173
[52] U.S. Cl. ..................................... 358/117; 358/122
[58] Field of Search ....................... 358/114, 117, 122; 178/22.01, 22.09, 22.11, 22.13

[56] References Cited

U.S. PATENT DOCUMENTS

| | | | |
|---|---|---|---|
| 4,225,884 | 9/1980 | Block et al. | 358/122 |
| 4,250,524 | 2/1981 | Tomizawa | 358/122 |
| 4,338,628 | 7/1982 | Payne et al. | 358/122 X |

*Primary Examiner*—S. C. Buczinski
*Assistant Examiner*—Linda J. Wallace
*Attorney, Agent, or Firm*—Russell E. Hattis; Stephen R. Arnold

[57] ABSTRACT

A wireless subscription television system arranged to transmit ciphered video signals from a transmitter to receivers in which the transmitting system comprises an enable code setting means, a transmitting means for transmitting control signals to allow a respective enable code of a receiving system to be picked up and a converting means for masking said enable codes and sending out masked enable codes, and on the other hand, the receiving system has a plurality of decoder systems each comprising a key code input means, a means for picking up a key code put in by the input means after converting it into an enable code by means of the control signals and a comparator means for determining if the picked-up enable code and the enable code as masked sent from the transmitting system are same or not. Thus, when the both enable codes come to be same, the respective decoder system is set in receivable condition.

1 Claim, 5 Drawing Figures

SUBSCRIPTION TELEVISION SYSTEM

RELATED APPLICATIONS

This application is a continuation-in-part of application Ser. No. 290,384, filed Aug. 5, 1981.

FIELD OF THE INVENTION

This invention relates to a wireless type subscription (pay) television system, and more particularly to improvements in a decoding method suitable for such a television system.

BACKGROUND OF THE INVENTION

As widely known, a wireless pay television system provides individual subscribers with television programs paid for and limited by individual agreements. Some prior art systems have some kind of receiving system, each provided with a hard-wired decoder permitting reception of only one of a plurality of program categories, so that the receiving system can receive a television program only when a category-defining signal supplied from the broadcasting station conforms with the assigned program category.

However, such a prior art system has the drawback that when a subscriber amends his subscription category to another, it is necessary to replace the entire receiving decoder with another, and further that a subscriber can disassemble his receiving system and easily rearrange the category-defining hard-wired circuit so as to receive other program categories to which he is not entitled.

DETAILED DESCRIPTION OF THE PREFERRED EMBODIMENT

The present invention will now be described in detail referring to the preferred embodiment illustrated in the accompanying drawings.

Figure 1:
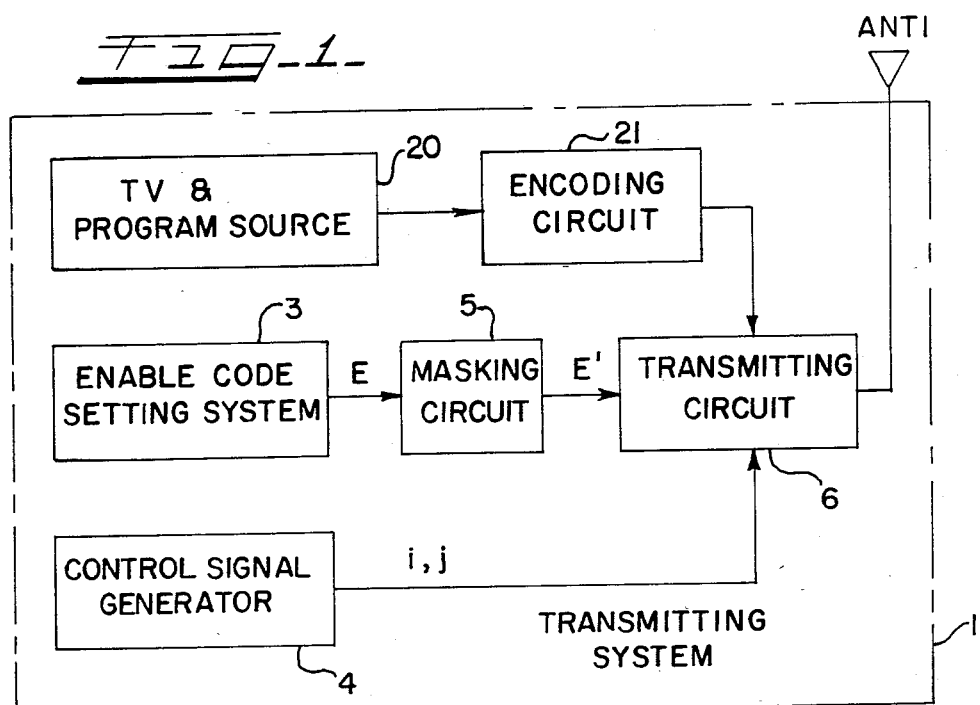
FIG. 1 is a functional block diagram of the elements of a television transmission system of the present invention.
Figure 2:
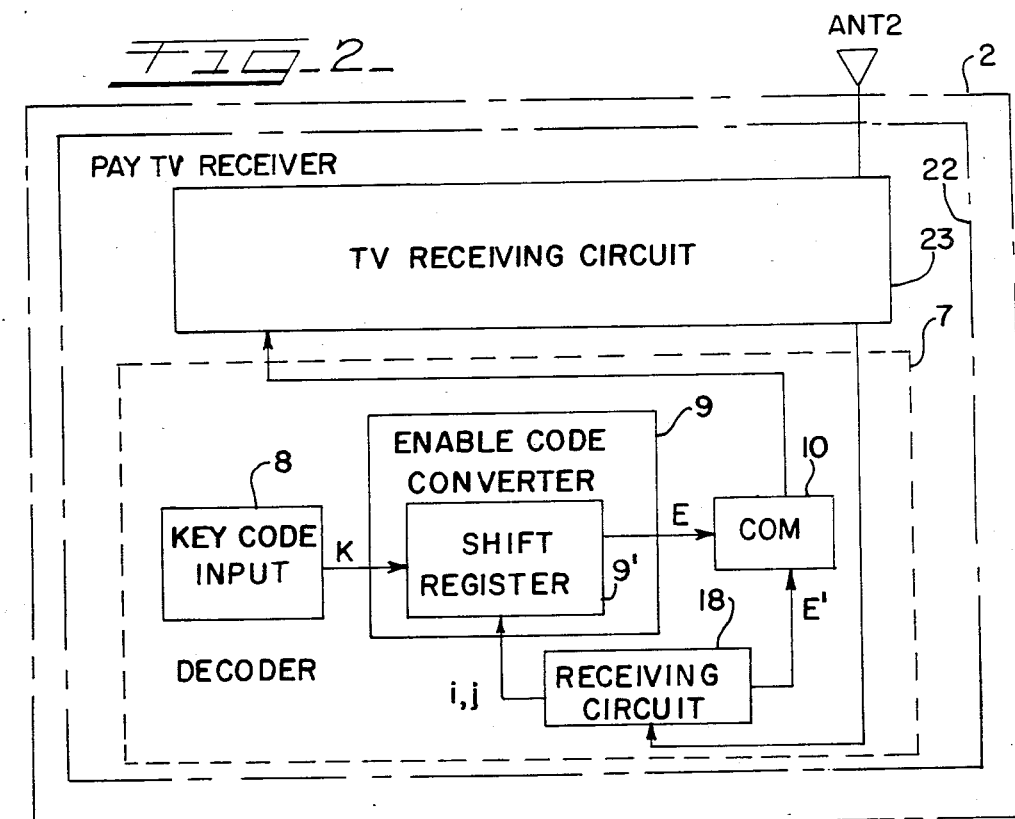
FIG. 2 is a functional block diagram of a receiver decoding system.

FIG. 1 shows a wireless pay television system according to the present invention in which enable codes common to a transmitting system and individual television receivers are employed to permit the television receivers to decode encoded video signals. Reference number 1 denotes a transmitting system (broadcasting station) and FIG. 2 shows a receiving system including a number of television receivers 22. As to the television receiver 22, FIG. 2 merely shows parts for signal processing relative to the enable code. The transmitting system 1 comprises an enable code-setting circuit 3 for setting several kinds of enable codes E (each consisting of bits $E_1 \sim E_{16}$ and each corresponding to a program category), a control signal generator 4 for generating control signals i and/or j and sending one or both at will to the TV receivers so as to permit them to pick up an enable code from a key code (consisting of bits $K_1 \sim K_{16}$) which will be described later.

The transmitting system also includes a masking circuit 5 for converting and masking the enable code E and sending out the masked enable code E'. To send the masked code E' and the control signals i and j to the TV receiver 22, they are superposed on an encoded video signal by a transmitting circuit 6 during blanking periods of the vertical synchronizing signal of the encoded video signal encoded by an encoding circuit 21 from the video signal supplied from a television and program source 20.

The receiver 22 has a receiving decoder system 7. A single key code is commonly used for all the receiving decoder systems. The receiving decoder system 7 comprises a key code input device 8 for entering the key code, an enable code converter 9 for converting the key code into an enable code in response to the control signal i or j, and a comparator 10 for determining whether or not the converted enable code conforms with the masked enable code E' transmitted from the transmitting system 1.

A receiving circuit 23 in the television receiver 22 is of a type well-known in the art of subscription television systems. The receiving circuit 23 separates the enable code E' and the control signals i and j from the encoded video signal and applies them to a receiving circuit 18. The receiving circuit 18 sends the control signals i and j to the converter 9 and the enable code E' to the comparator 10. The comparator 10 generates a signal S upon conformity of both the enable codes and applies it to a television receiving circuit 23 to place the television receiver 22 in condition for reception, i.e. capable of decoding and reproducing said video signal.

Figure 3:
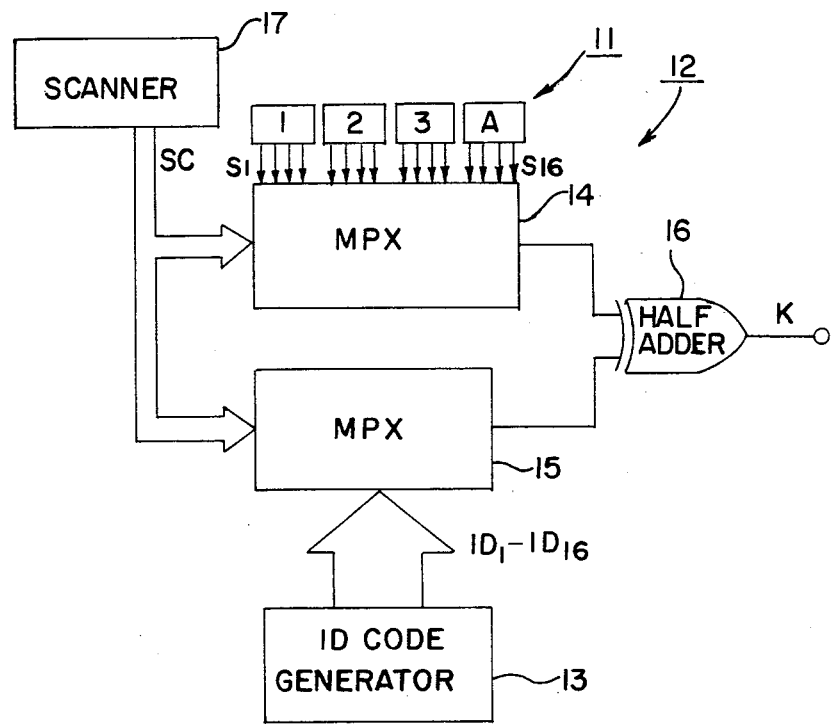
FIG. 3 shows details of a key code entry system.

FIG. 3 shows a digital switching device 11 and an operational circuit 12, both constituting the key code input device 8 of FIG. 2. The digital switching device comprises 4 hexadecimal digital switching elements, for example, to allow a subscriber to enter at will a number which leads to the enable code of 16 bits.

In this embodiment, the enable code E itself is not directly entered, so as not to disclose it to other subscribers or outsiders. Instead, the enable code E is obtained from the key code produced by the following operation in the operational circuit 12. The receiving decoder system 7 has a unique identification code. The subscriber enters a given entry number through the digital switches 11. The operational circuit 12 performs an operation on the entry number and the identification code and makes the key code. Thus, the enable code E appears random to other subscribers or outsiders before it is actually made from the key code.

In FIG. 3, the entry number (consisting of bits $S_1 \sim S_{16}$) set by the subscriber via the digital switching device 11 and identification code (consisting of bits $ID_1 \sim ID_{16}$) generated by an identification code generator 13 are applied to multiplexers 14 and 15 respectively. The multiplexers 14 and 15 scan their respective addresses by scanning signals SC from a scanner 17 and convert the entry code and the identification code to serial data. Sequential bits of both serial data are applied to a half adder 16. The half adder 16 adds each bit of one of the serial data to an associated bit of the other serial data and makes the key code K (consisting of bits $K_1 \sim K_{16}$). Thus, the equation $S_1 \veebar ID_1 \sim S_{16} \veebar ID_{16} = K_1 \sim K_{16}$ is obtained.

Figure 4:
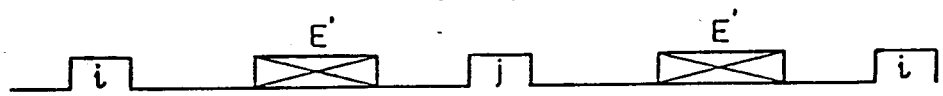
FIG. 4 shows the relation between control signals and enable codes.

The transmitting system 1 transmits the enable code E' and the control signals i and j in the form as shown in FIG. 4. The number of the control signals depends on the number of TV program categories. The system shown has two categories. The enable code E' is used to see whether it conforms with the enable code E which is picked up by the control signal i or j in each receiving decoded system 7 as described above. Then, the comparator 10 compares the code E with the code E', by means of an algorithm for the purpose of prevention of wiretap. When the both codes E and E' conform with each other, the receiving decoder system 7 is disposed in an operative condition. If both the control signals i and j are transmitted, all the receiving systems, whichever categories they subscribe to, are disposed receivable, whereas if only one control signal i, for example, is transmitted, only the receiving systems subscribing to the category corresponding to the control signal i are enabled.

The converter 9 converts the key code K into the enable code E in response to the control signals i and j from the receiving circuit 18 in the following manner. When the enable code E is expressed by $E_1 \sim E_i \sim E_{16}$ and the key code K by $K_1 \sim K_i \sim K_{16}$, $$K_i \sim K_{16} K_1 \sim K_{i-1} = E_1 \sim E_{16}$$

Figure 5:
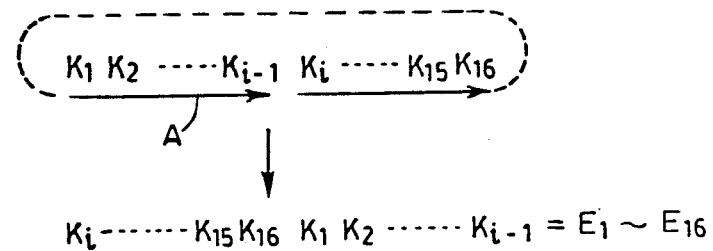
FIG. 5 is an explanation diagram of a method for picking up an enable code from key codes.

That is, a circulating shift register 9' provided in the enable code converter 9 picks up the bits of the key code, sequentially in the direction shown by the arrow A in FIG. 5, starting from the bit $K_i$ corresponding to the control signal i. One entire circulation of the picked-up key code bits starting from the bit $K_i$ makes the enable code E consisting of the bits $E_1 \sim E_i \sim E_{16}$.

Similarly, $K_j \sim K_{16} K_1 \sim K_{j-1} = E_1 \sim E_j \sim E_{16}$. In this case, the key code bits may be picked up, starting from the bit $K_j$ corresponding to the control signal j so that one entire circulation of the key code bits makes the enable code consisting of the bits $E_1 \sim E_j E_{16}$.

Thus, the system can make two kinds of enable codes consisting of the key code bits as follows:

$$K_1 \sim K_{16} = E_i \sim E_{16} E_1 \sim E_{i-1}$$

$$K_1 \sim K_{16} = E_j \sim E_{16} E_1 \sim E_{j-1}$$

The enable codes may also be expressed as follows:

$$S_1 \forall ID_1 \sim S_{16} \forall ID_{16} = E_i \sim E_{16} E_1 \sim E_{i-1}$$

$$S_1 \forall ID_1 \sim S_{16} \forall ID_{16} = E_j \sim E_{16} E_1 \sim E_{j-1}$$

Thus, the transmitting station may inform at will a subscriber of one or both of the entry numbers which lead to the enable codes to enable the receiving system.

The comparator 10 compares the enable code E obtained from the key code with the enable code E' supplied via the receiving circuit 18. If both the enable codes E and E' conform, the receiving decoder system is set for reception.

As described above, the system according to the invention makes it possible for the transmitting station to control the enable code generating operation of the individual receiving systems by control from the transmitting station so as to enable merely the selected receiving systems subscribing to the currently transmitted program category. Thus, amendment of subscribed category may readily be effected by merely informing the subscriber of another number to be entered into the digital switch.

I claim:

1. A subscription television system including a transmitting system for transmitting ciphered video signals, enable codes each having a plurality of bits, and control signals, said system further including a receiving system having a plurality of subscription television receivers each having a decoder, wherein said decoder comprises:

a receiving means for receiving the enable code and the control signals from said transmitting system;

a key code input means for setting a key code having a plurality of key code bits, said key code input means having a plurality of digital switches to input said key code by means of said digital switches;

a converting means for converting said key code from said key code input means into enable codes in response to control signals from said receiving means;

a comparator means for comparing an enable code from said converting means with the enable code from said receiving means, so as to determine if both codes are consistent or not, and for producing a signal to render said television receiver operative to receive said ciphered video signals when said both codes are consistent, said key code input means comprising:

a first multiplexer circuit for receiving bit signals sent by said digital switches;

an identification code generating circuit;

a second multiplexer circuit for receiving identification codes from said identification code generating circuit;

a scanner actuating said first and second multiplexer circuits to sequential sensings of said bit signals from said digital switches and said identification codes from said identification code generating circuit, so as to provide at the output of each of said multiplexer circuits a converted serial signal representation of the individual bit codes provided to said multiplexers;

a half adding circuit for adding the serial data read out from said first and second multiplexer circuit; and converting means including a shift register for obtaining said enable code from said key code by circulating the key code bits with the key code bit corresponding to the control signal and progressively picking up each bit therein.

* * * * *